(12) United States Patent
Chandramouli et al.

(10) Patent No.: US 10,645,744 B2
(45) Date of Patent: May 5, 2020

(54) METHOD AND APPARATUS FOR IMPLEMENTING A SERVICE FLOW ACROSS DIFFERENT SYSTEMS

(71) Applicant: NOKIA SOLUTIONS AND NETWORKS OY, Espoo (FI)

(72) Inventors: Devaki Chandramouli, Plano, TX (US); Christian Mahr, Ulm (DE); Subramanya Chandrashekar, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/577,115

(22) PCT Filed: Apr. 28, 2016

(86) PCT No.: PCT/EP2016/059504
§ 371 (c)(1),
(2) Date: Nov. 27, 2017

(87) PCT Pub. No.: WO2016/188701
PCT Pub. Date: Dec. 1, 2016

(65) Prior Publication Data
US 2018/0184480 A1 Jun. 28, 2018

(30) Foreign Application Priority Data
May 26, 2015 (IN) .......................... 2637/CHE/2015

(51) Int. Cl.
*H04M 1/00* (2006.01)
*H04W 76/16* (2018.01)
(Continued)

(52) U.S. Cl.
CPC .......... *H04W 76/16* (2018.02); *H04W 48/12* (2013.01); *H04W 88/06* (2013.01); *H04W 88/10* (2013.01)

(58) Field of Classification Search
CPC ..... H04W 40/04; H04W 48/00; H04W 48/10; H04W 48/12; H04W 48/18
See application file for complete search history.

(56) References Cited

U.S. PATENT DOCUMENTS

| 2014/0315597 | A1* | 10/2014 | Periyalwar | H04W 88/06 455/552.1 |
| 2015/0148038 | A1* | 5/2015 | Griot | H04W 8/18 455/435.3 |
| 2016/0029296 | A1* | 1/2016 | Bergstrom | H04W 76/16 455/418 |

FOREIGN PATENT DOCUMENTS

| CN | 1220356 C | 9/2005 |
| EP | 1 496 668 A1 | 1/2005 |

OTHER PUBLICATIONS

International Search Report corresponding to International Patent Application No. PCT/EP2016/059504, dated Jul. 20, 2016.
(Continued)

*Primary Examiner* — Tuan Pham
(74) *Attorney, Agent, or Firm* — Squire Patton Boggs (US) LLP

(57) ABSTRACT

A method and apparatus may include providing, by a network node, an indication to a user equipment. The indication indicates that the network node supports interworking between a first radio-access technology and a second radio-access technology. The method may also include receiving a request to set up a service flow. The method may also include setting up the service flow.

14 Claims, 11 Drawing Sheets

(51) Int. Cl.
*H04W 48/12* (2009.01)
*H04W 88/06* (2009.01)
*H04W 88/10* (2009.01)

(56) References Cited

OTHER PUBLICATIONS

NGMN 5G white paper; Version 1.0, Feb. 17, 2015, 125 pages.
3GPP TS 23.401 V13.2.0 (Mar. 2015); 3rd Generation Partnership Project; Technical Specification Group Services and System Aspects; General Packet Radio Service (GPRS) enhancements for Evolved Universal Terrestrial Radio Access Network (E-UTRAN) access (Release 13), 313 pages.

* cited by examiner

METHOD AND APPARATUS FOR IMPLEMENTING A SERVICE FLOW ACROSS DIFFERENT SYSTEMS

BACKGROUND

Field

Embodiments of the present invention relate to implementing a service flow across different systems.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include providing, by a network node, an indication to a user equipment. The indication indicates that the network node supports interworking between a first radio-access technology and a second radio-access technology. The method may also include receiving a request to set up a service flow. The method may also include setting up the service flow.

In the method of the first embodiment, the network node comprises an evolved Node B that is configured to use a technology stack. The technology stack comprises a 5G protocol stack on top of an LTE Medium Access Control layer and on top of a LTE physical layer. The said 5G protocol stack includes 5G NAS and 5G RRC.

In the method of the first embodiment, the providing the indication comprises providing an indication that the network node is configured to support a technology stack. The technology stack comprises a Non-Access Stratum protocol of the first radio-access technology over a radio-resource-control layer of the second radio-access technology.

In the method of the first embodiment, the providing the indication comprises providing an indication that the network node is configured to use a technology stack. The technology stack comprises a 5G Non-Access Stratum protocol over an LTE radio-resource-control layer.

According to a second embodiment, an apparatus may include at least one processor. The apparatus may also include at least one memory including computer program code. The at least one memory and the computer program code may be configured, with the at least one processor, to cause the apparatus at least to provide an indication to a user equipment. The indication indicates that the apparatus supports interworking between a first radio-access technology and a second radio-access technology. The apparatus may also be caused to receive a request to set up a service flow. The apparatus may also be caused to set up the service flow.

In the apparatus of the second embodiment, the apparatus comprises an evolved Node B that is configured to use a technology stack. The technology stack comprises a 5G protocol stack on top of an LTE Medium Access Control layer and on top of a LTE physical layer. The said 5G protocol stack includes 5G NAS and 5G RRC.

In the apparatus of the second embodiment, the providing the indication comprises providing an indication that the apparatus is configured to support a technology stack. The technology stack comprises a Non-Access Stratum protocol of the first radio-access technology over a radio-resource-control layer of the second radio-access technology.

In the apparatus of the second embodiment, the providing the indication comprises providing an indication that the network node is configured to use a technology stack. The technology stack comprises a 5G Non-Access Stratum protocol over an LTE radio-resource-control layer.

According to a third embodiment, a computer program product may be embodied on a non-transitory computer readable medium. The computer program product may be configured to control a processor to perform a method according to the first embodiment.

According to a fourth embodiment, a method may include receiving, by a user equipment, an indication from a network node. The indication indicates that the network node supports interworking between a first radio-access technology and a second radio-access technology. The method may also include transmitting a request to set up a service flow. The method may also include performing the service flow.

In the method of the fourth embodiment, the user equipment is configured to use a technology stack. The technology stack comprises a 5G protocol stack on top of an LTE Medium Access Control layer and on top of a LTE physical layer. The said 5G protocol stack includes 5G NAS and 5G RRC.

In the method of the fourth embodiment, the receiving the indication comprises receiving an indication that the network node is configured to support a technology stack. The technology stack comprises a Non-Access Stratum protocol of the first radio-access technology over a radio-resource-control layer of the second radio-access technology.

In the method of the fourth embodiment, the receiving the indication comprises receiving an indication that the network node is configured to use a technology stack. The technology stack comprises a 5G Non-Access Stratum protocol over an LTE radio-resource-control layer.

According to fifth embodiment, an apparatus may include at least one processor. The apparatus may also include at least one memory including computer program code. The at least one memory and the computer program code may be configured, with the at least one processor, to cause the apparatus at least to receive an indication from a network node. The indication indicates that the network node supports interworking between a first radio-access technology and a second radio-access technology. The apparatus may also be caused to transmit a request to set up a service flow. The apparatus may also be caused to perform the service flow.

In the apparatus of the fifth embodiment, the apparatus comprises a user equipment, and the apparatus is configured to use a technology stack. The technology stack comprises a 5G protocol stack on top of an LTE Medium Access Control layer and on top of a LTE physical layer. The said 5G protocol stack includes 5G NAS and 5G RRC.

In the apparatus of the fifth embodiment, the receiving the indication comprises receiving an indication that the network node is configured to support a technology stack. The technology stack comprises a Non-Access Stratum protocol of the first radio-access technology over a radio-resource-control layer of the second radio-access technology.

In the apparatus of the fifth embodiment, the receiving the indication comprises receiving an indication that the network node is configured to use a technology stack. The technology stack comprises a 5G Non-Access Stratum protocol over an LTE radio-resource-control layer.

According to a sixth embodiment, a computer program product may be embodied on a non-transitory computer readable medium. The computer program product may be configured to control a processor to perform a method according to the fourth embodiment.

BRIEF DESCRIPTION OF THE DRAWINGS

For proper understanding of the invention, reference should be made to the accompanying drawings, wherein.

DETAILED DESCRIPTION

Figure 1:
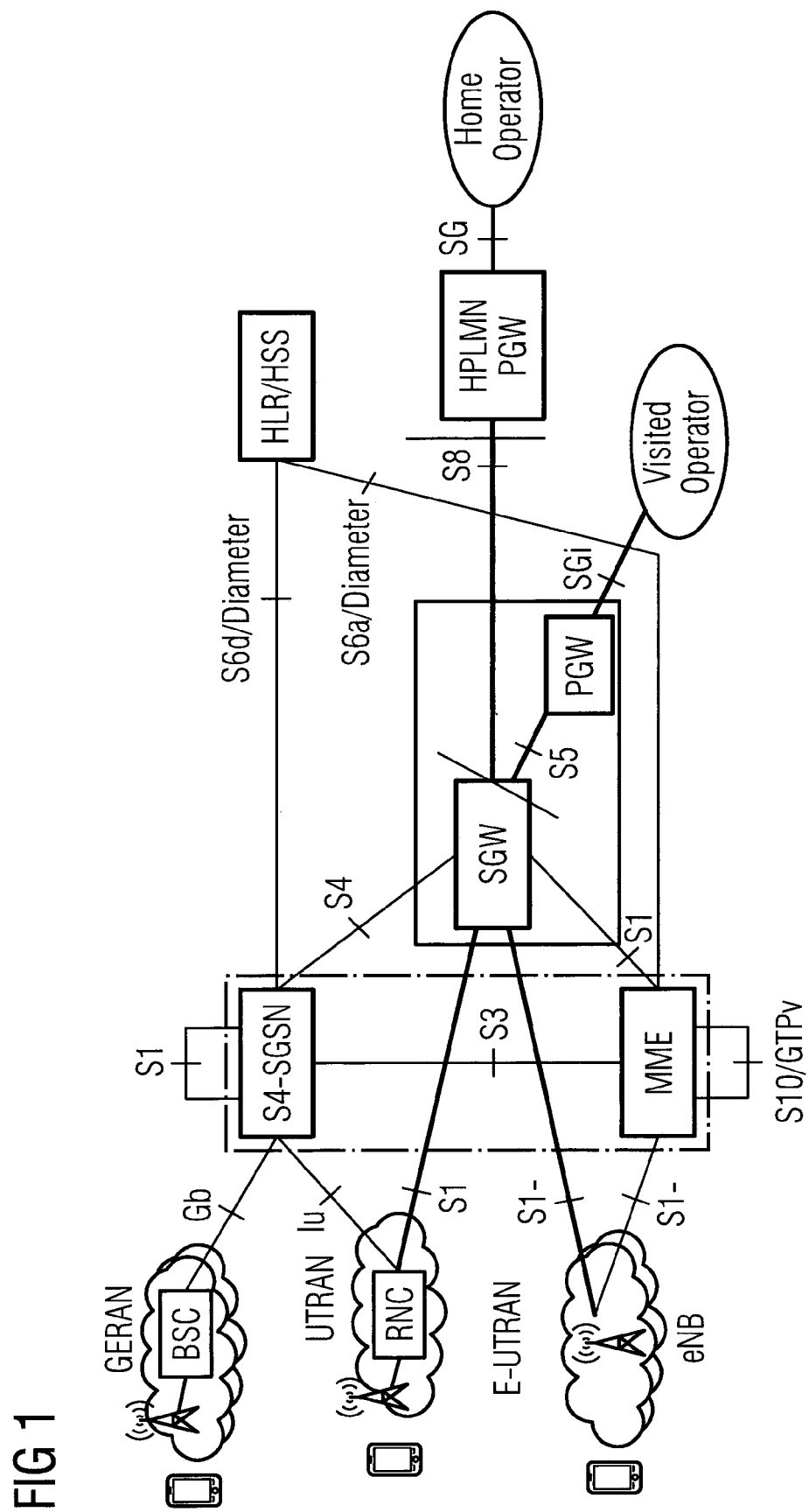
FIG. 1 illustrates an example evolved packet core architecture.

Certain embodiments of the present invention relate to implementing a service flow across different systems. Specifically, certain embodiments may relate to implementing a 5G service flow across combined LTE/5G systems. Evolved Packet System (EPS) may be considered as a successor of General Packet Radio System (GPRS). EPS provides new radio interfaces and new packet core network functions for broadband wireless data access. EPS core network functions include a Mobility Management Entity (MME), a Packet Data Network Gateway (PDN-GW) and a Serving Gateway (S-GW), for example. FIG. 1 illustrates an example evolved packet core architecture.

A common packet domain core network may be used for both GSM Edge Radio Access Networks (GERAN) and Universal Terrestrial Radio Access Networks (UTRAN). This common core network may provide GPRS services. A common core network may be supported in the long-term architecture.

Figure 2:
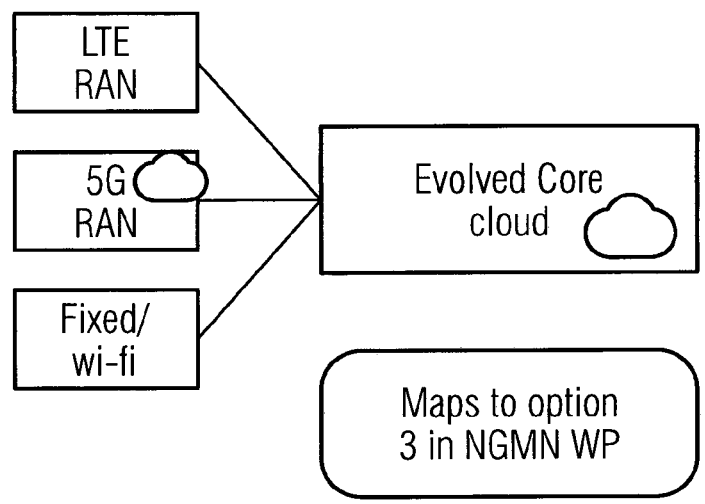
FIG. 2 illustrates an example architecture according to certain embodiments of the present invention.

FIG. 2 illustrates an example architecture according to certain embodiments of the present invention. FIG. 2 illustrates a proposed architecture for long term convergence. Certain embodiments of the present invention may enable use of such an architecture.

During the early days of 5G deployment, the coverage area of 5G will not be expected to be nationwide. As such, it may be desirable to allow 5G devices to camp in other radio access technologies (such as allowing 5G devices to camp in LTE, for example) that are widely available.

Figure 3:
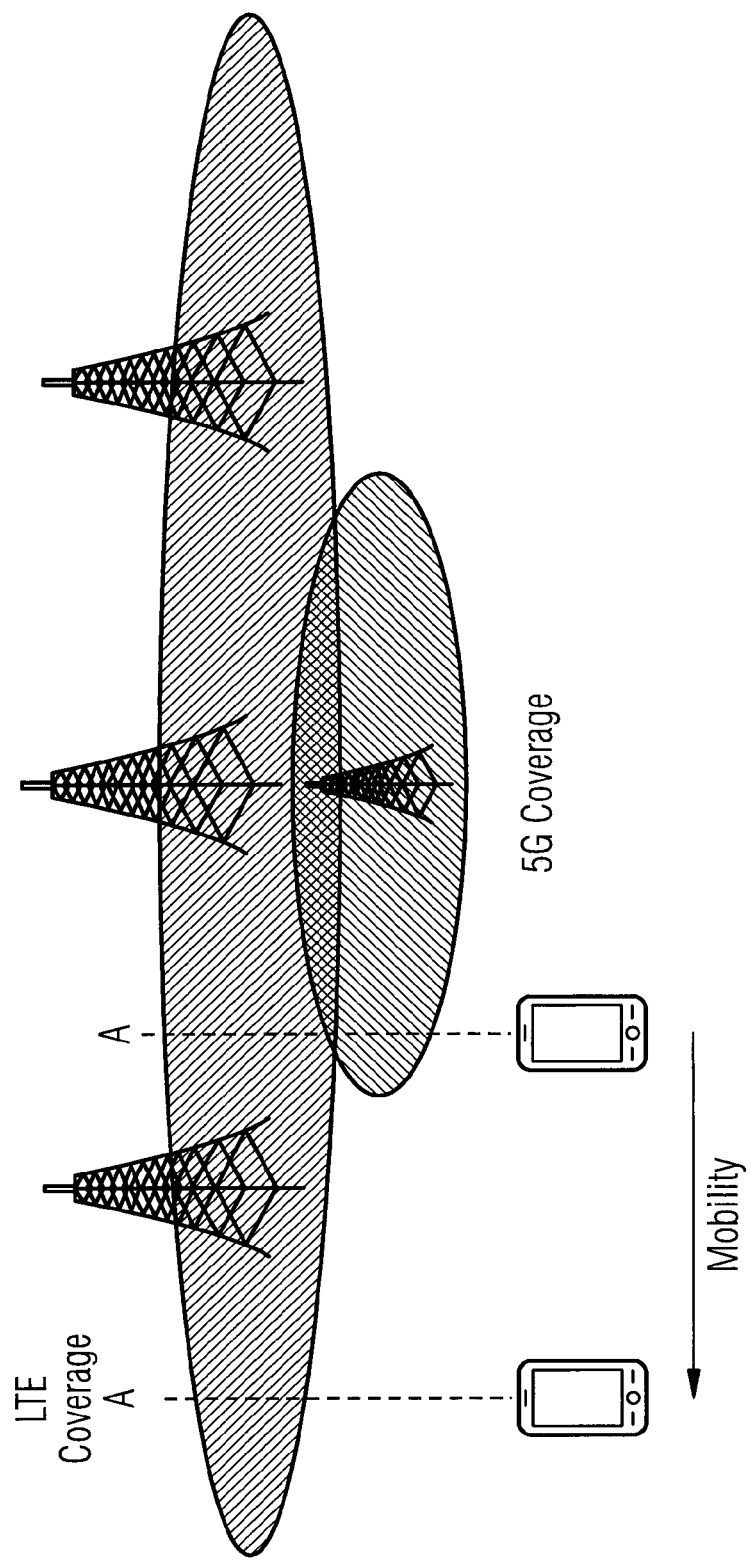
FIG. 3 illustrates a radio access transfer handover.

FIG. 3 illustrates a radio access transfer handover. Traditional inter-Radio-Access-Technology (inter-RAT) handover (HO) was intended to be used with macrocells with larger coverage areas. Thus, problems relating to frequent mobility (and corresponding ping-pong effects) are generally not expected to occur. With 5G small cells in the higher end of the spectrum (such as in the cmWave and mmWave portion of the spectrum), frequent RAT changes may be expected. Thus, it may be desirable to improve mobility robustness and reliability.

Figures 4, 4A:
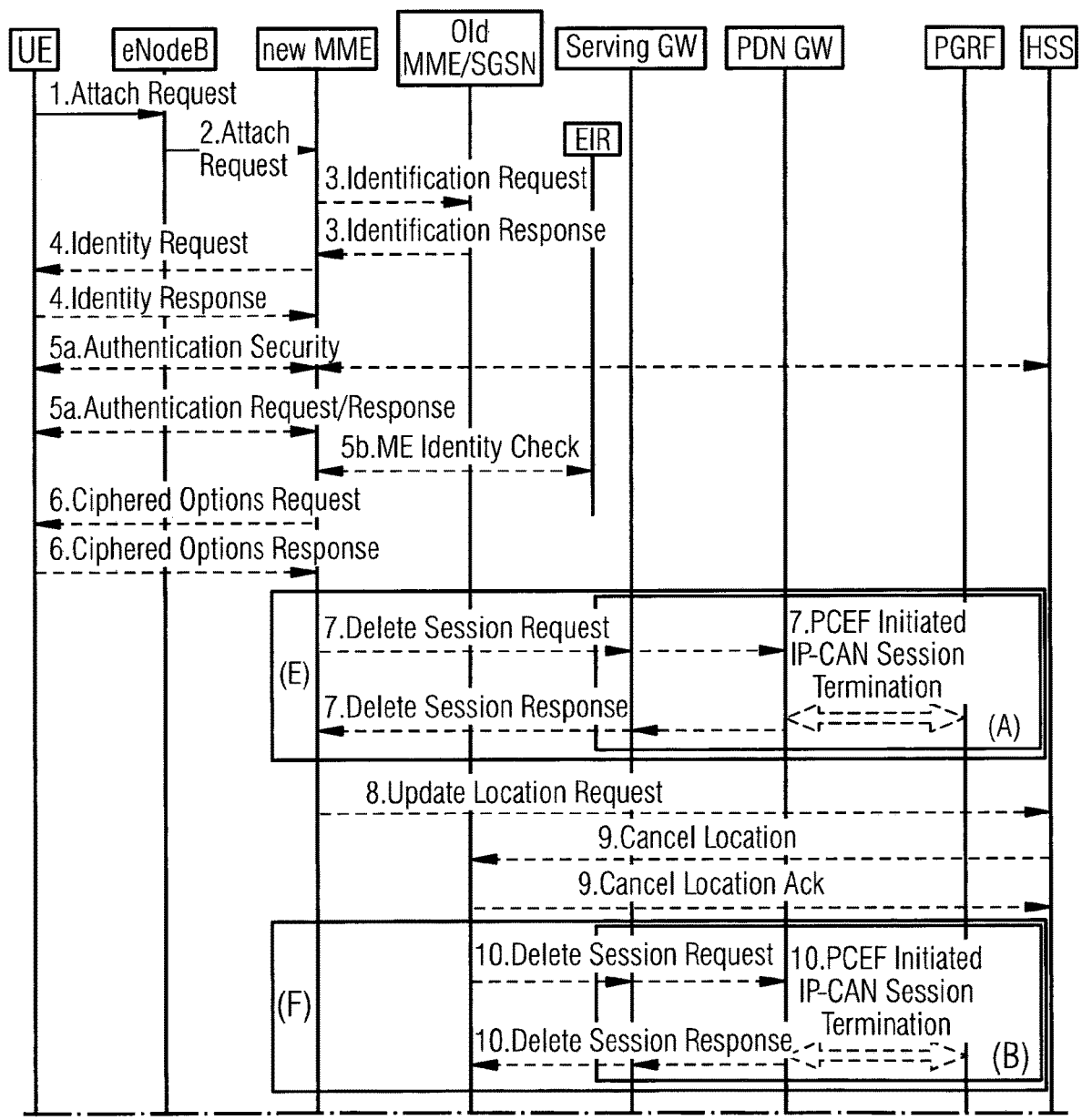
FIG. 4 illustrates setting up a service flow in accordance with the previous approaches.
Figure 4B:
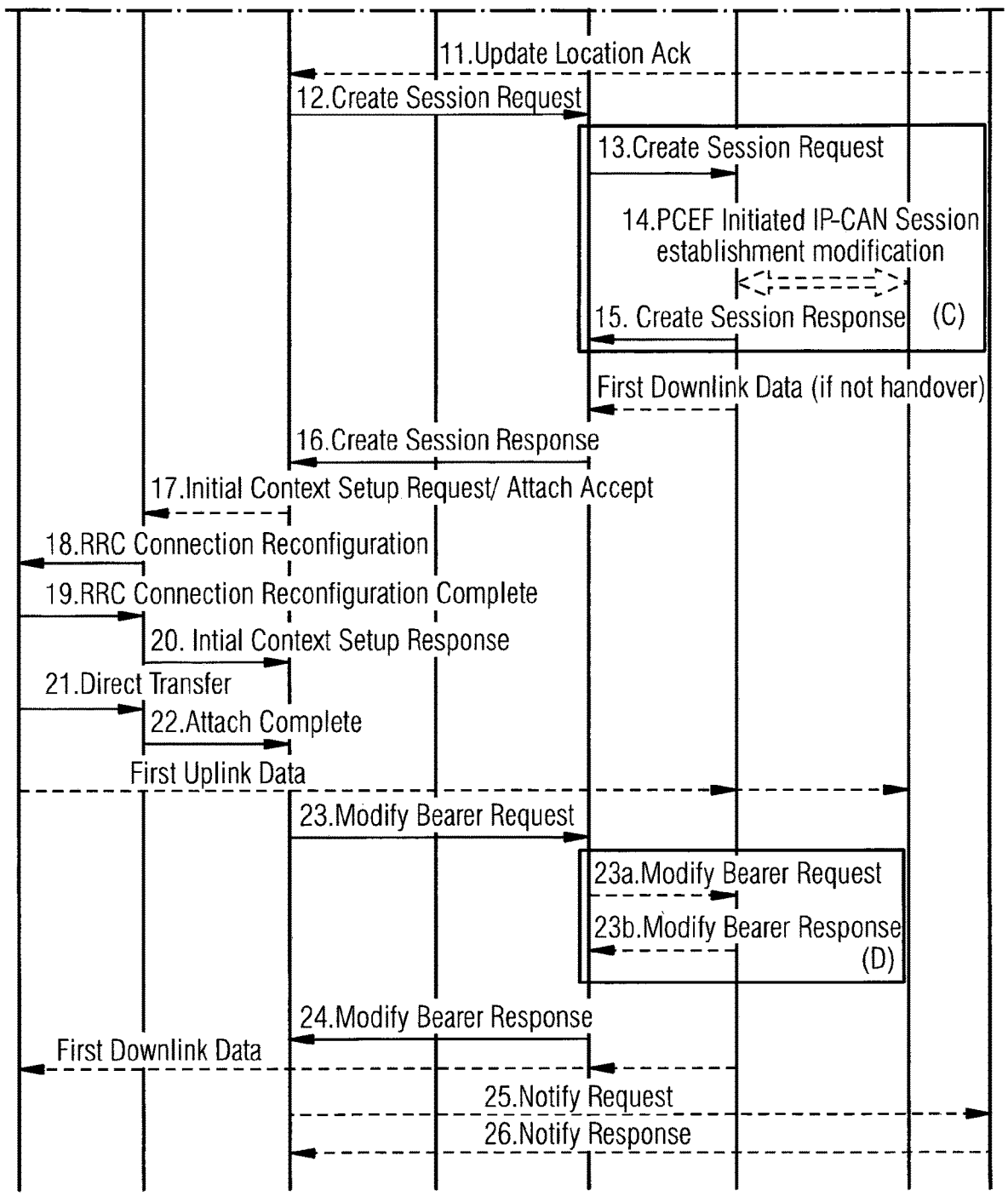

FIG. 4 illustrates setting up a service flow in accordance with the previous approaches. With the previous approach of FIG. 4, a UE will assume that the network supports PDN connection/EPS bearer and E-UTRAN Radio Access bearers. The network generally supports only LTE functionality. So, the UE will initiate an attach request/PDN connectivity request, as specified in TS 23.401.

With certain embodiments of the present invention, the network has the opportunity to broadcast an indication towards the UE. The indication may indicate that the network can support a hybrid protocol stack and, more specifically, new Quality-of-Service/session management procedures. Thus, the UE can determine whether or not to use the hybrid stack, and the UE may initiate attach request/service flow requests based on that indication.

User equipment (UE) should obtain packet-data-network (PDN) connections when the UE supports LTE and 5G protocol stacks, and when the UE is currently in a coverage area of LTE radio access (as served by an evolved packet core (EPC), for example). The UE should obtain service flows when the UE supports the LTE and 5G protocol stacks, and when the UE is currently in the coverage area of 5G radio access (as served by the evolved core). Issues may arise when attempting to support user plane dual connectivity between LTE and 5G in a seamless manner (for example, with 5G as a master, and LTE as a slave) in the future, when 5G is supported as a standalone radio access. For example, a service flow may need to be mapped to bearers in LTE, resulting in some complexity and latency.

Certain embodiments of the present invention are directed to a method for setting up a 5G user plane session on the LTE side. For example, certain embodiments may be directed to setup of a service flow of a user equipment (UE) that supports an LTE and 5G protocol stack and that is under LTE coverage. With certain embodiments, a 5G Non-access stratum (NAS) protocol can run on top of an LTE Radio-Resource-Control (RRC) layer, and the network and the UE may be able to support this configuration. Such a user plane setup towards the LTE eNB may be employed for single and/or dual connectivity scenarios.

Certain embodiments of the present invention may be directed to a number of different interworking options. The different interworking options may include the following possibilities: (1) 5G+LTE UE may interwork with a legacy LTE eNB and a legacy MME, (2) 5G+LTE UE may interwork with a new LTE eNB and a legacy MME, (3) 5G+LTE UE may interwork with a legacy LTE eNB and a new core (such as a control Mobile gateway (cMGW), for example), (4) 5G+LTE UE may interwork with a new LTE eNB and a new core (cMGW), for example.

When implementing hybrid configuration of different radio access technologies (such as of 5G and LTE, for example), the protocol stack may configure 5G-NAS over LTE-RRC. When implementing the hybrid configuration, a 5G protocol stack (which includes 5G NAS & 5G RRC) may be atop of an LTE physical layer (PHY), and atop of a medium access control (MAC).

Figure 5:
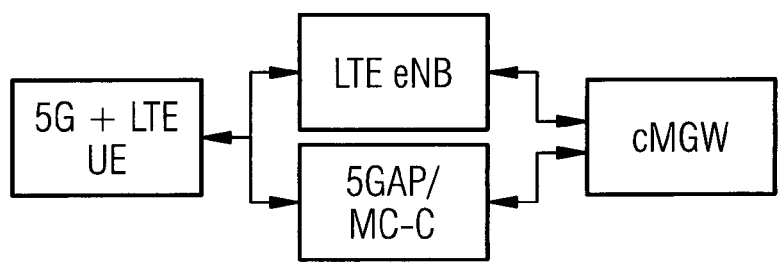
FIG. 5 illustrates an example architecture according to certain embodiments of the present invention.

FIG. 5 illustrates an example architecture according to certain embodiments of the present invention. With the example architecture of FIG. 5, a 5G+LTE UE interwork may interwork with a legacy LTE eNB and a new core (cMGW). The example architecture of FIG. 5 may also be used when a 5G+LTE UE interworks with a new LTE eNB and a new core (cMGW). The 5G Access Point (AP) is the base station, considered an equivalent of LTE eNB in a 5G network, while MC-C is a logical entity which may terminate the RRC of 5G radio interfaces and may anchor multi-connectivity. MC-C may refer to a Multi controller that could serve as an anchor point.

Figure 6:
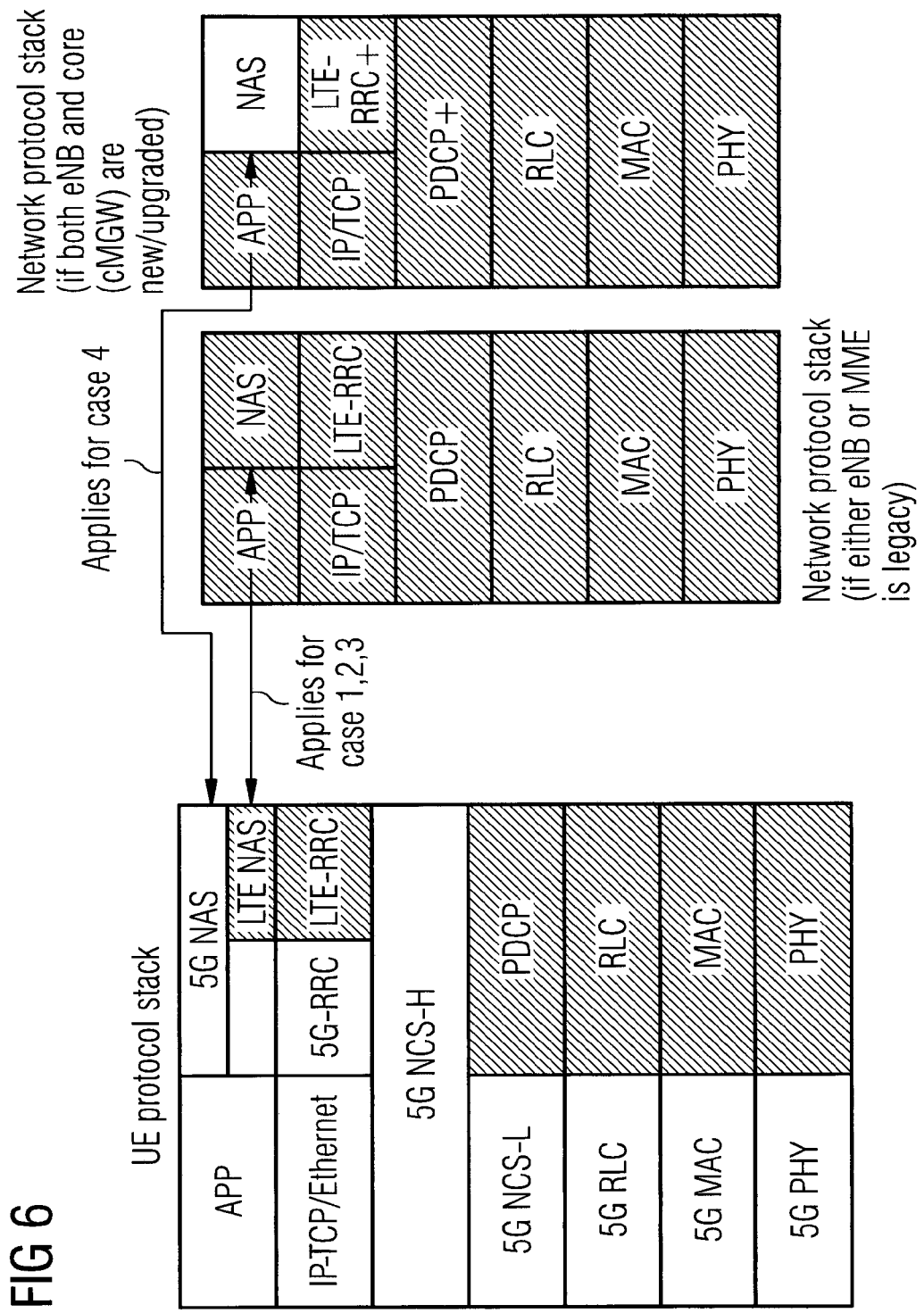
FIG. 6 illustrates an example protocol stack according to certain embodiments of the present invention.

FIG. 6 illustrates an example protocol stack according to certain embodiments of the present invention. With certain embodiments of the present invention, an evolved Node B (eNB) could be further enhanced to include a 5G NAS protocol stack on top of the LTE RRC.

Figure 7:
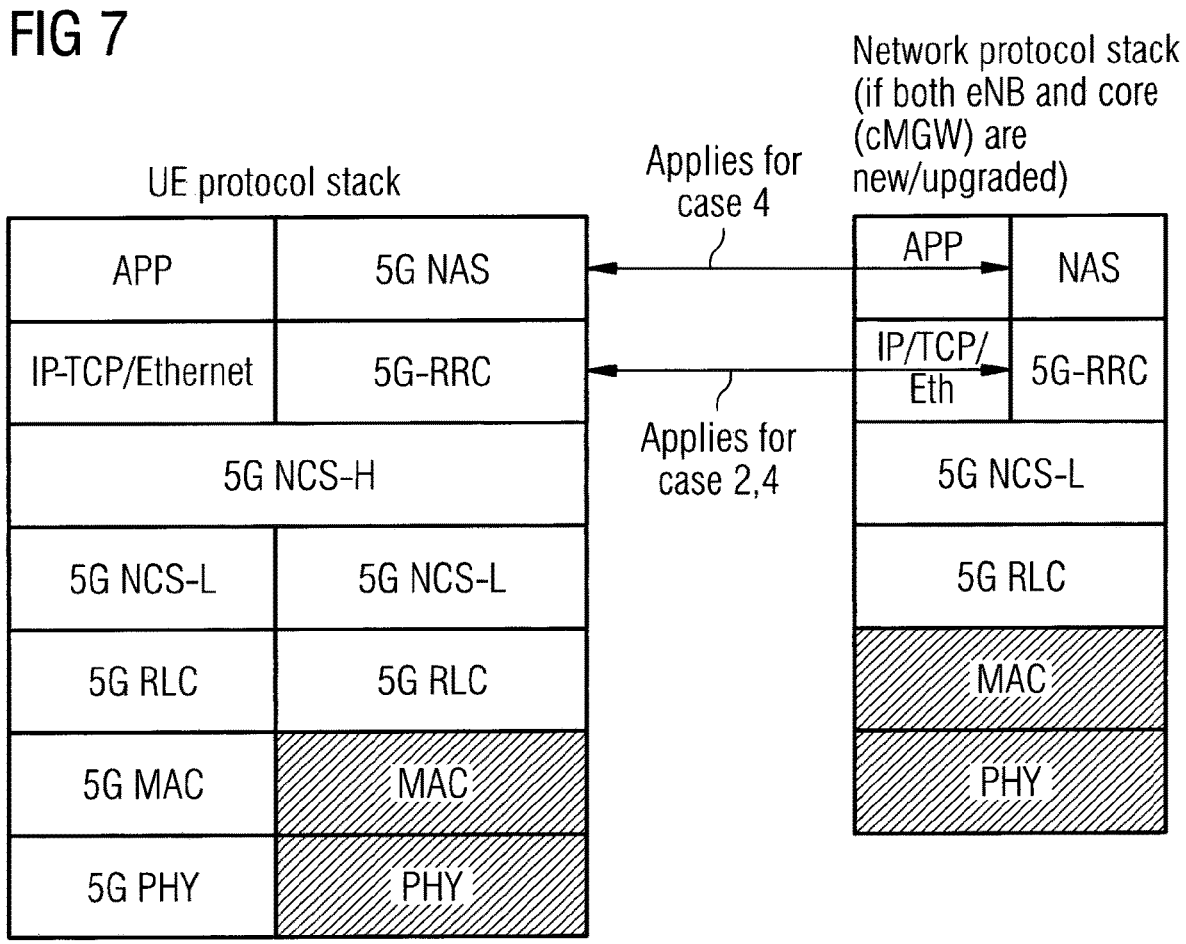
FIG. 7 illustrates another example protocol stack according to certain embodiments of the present invention.

FIG. 7 illustrates another protocol stack that may be used according to certain embodiments of the present invention. With certain embodiments of the present invention, an evolved Node B (eNB) could be further enhanced to include a 5G protocol stack on top of the LTE MAC and PHY layers. This enhancement could be particularly useful if the standardization of the 5G wide area radio interface (5G macro) is delayed. Further, this would render the possibility of sub-6 GHz spectrum to be used by 5G UEs as well.

In terms of user-plane connectivity, the above-described configurations may resolve the following. The following are the different interworking options that are possible: (1) 5G+LTE UE may interwork with a legacy LTE eNB and a legacy MME, (2) 5G+LTE UE may interwork with a new LTE eNB and a legacy MME, (3) 5G+LTE UE may interwork with a legacy LTE eNB and a new core (cMGW), and/or (4) 5G+LTE UE interworks with a new LTE eNB and a new core (cMGW).

With option (1), where 5G+LTE UE interworks with a legacy LTE eNB and a legacy MME, user plane connectivity may be based on a packet data network (PDN) connection/bearer concept, as defined in 3GPP for LTE.

With option (2), where 5G+LTE UE may interwork with a new LTE eNB and a legacy MME, user plane connectivity may be based on a PDN connection/bearer concept as defined in 3GPP for LTE.

With option (3), where 5G+LTE UE may interwork with a legacy LTE eNB and a new core (cMGW), user plane connectivity may be based on a PDN connection/bearer concept, as defined in 3GPP for LTE, with the eNB as a legacy eNB.

With option (4), where 5G+LTE UE may interwork with a new LTE eNB and a new core (cMGW), user plane connectivity may be based on a new service flow concept as all involved entities are upgraded, and thus can be fully optimized to support new and efficient service flow. An old UE may still be able to obtain an LTE PDN connection/bearer from the new network using the same nodes.

Figure 8:
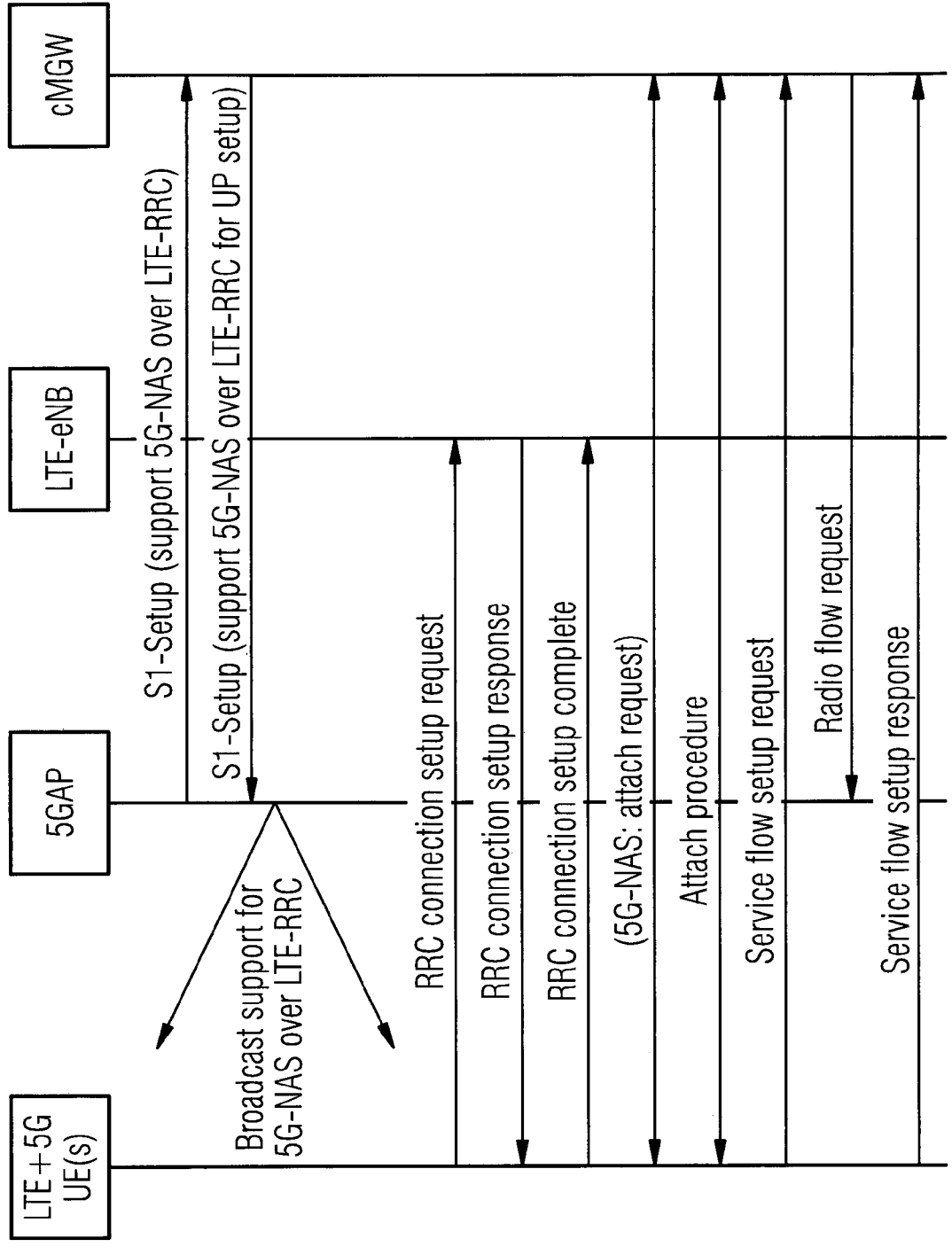
FIG. 8 illustrates a procedure for setting up a service flow in accordance with certain embodiments of the present invention.

Certain embodiments of the present invention may set up a service flow in an LTE eNB. For example, certain embodiments may set up the service flow for a LTE/5G UE, when the UE is in LTE coverage that is served by a new core, in accordance with certain embodiments of the present invention. FIG. 8 illustrates a procedure for setting up a service flow. When an eNB is being set up, the eNB initiates S1-Setup, and the eNB may indicate that the eNB can carry 5G NAS over LTE-RRC or 5G NAS & 5G RAN protocol stack over LTE MAC and LTE PHY. 5GAP may refer to a 5G Access Point. In the S1-Setup response message, cMGW may indicate that the cMGW supports 5G-NAS for user plane (UP) setup over LTE protocol stack. The eNB may broadcast that the eNB can support interworking with a new NAS protocol stack that runs on top of LTE-RRC and/or LTE dual connectivity, based on a service flow setup. The eNB may even generally indicate that the network can support 5G-NAS over LTE-RRC or 5G NAS & 5G RAN protocol stack over LTE MAC and LTE PHY in a given tracking area (TA). This is an indication that the UE can use to decide whether the UE can request a 5G Service Flow, as long as the UE selects the broadcasted TA. When the UE selects the given eNB/TA, the UE may use a 5G NAS stack over LTE RRC, or 5G NAS & 5G RAN protocol stack over LTE MAC and LTE PHY. Thus, in the former case, UE will use LTE-RRC procedures and 5G-NAS procedures for registration and obtaining user plane connectivity from the network.

In certain embodiments, the UE may request a service flow (SF). The network may establish an end-to-end SF for the UE. There may not be any dedicated bearer setup, and thus the LTE radio should also be capable of performing in-service flow differentiation. Thus, the service flow can be established either across LTE, 5G, or both, in case of dual connectivity.

The above-described call flow relates to a mobile-originated scenario for user plane connectivity. With the mobile-terminated scenario, the network pages the UE when the network is to deliver downlink packets. The network could possibly include the same information (for example, a support indicator for 5G-NAS (over LTE-RRC) within a broadcast System Information Block (SIB)) within the paging message. In response to the paging message, the UE can then follow the signalling call flow as described above.

A benefit provided by certain embodiments, for dual connectivity procedures between LTE and 5G, is that only one procedure may need to be followed—such as following 5G-Service-flow-based quality-of-service (QoS) principles for user plane (UP) dual connectivity (DC) bearer split, for example.

The signalling flow for the setup of a service flow involving a hybrid eNB (that employs a 5G protocol stack on top of an LTE MAC & PHY or 5G NAS & 5G RAN protocol stack over LTE MAC and LTE PHY, for example) and an LTE/5G UE may be the same as the setup of a service flow in a native 5G network. For this scenario, the eNB may also include support for a 5G protocol stack on top of LTE MAC & PHY. The eNB may indicate support for this arrangement in a broadcast SIB, within a paging message.

Figure 9:
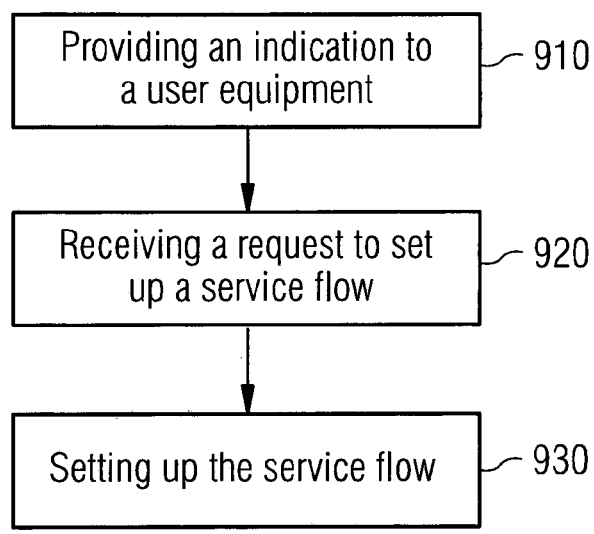
FIG. 9 illustrates a flowchart of a method in accordance with certain embodiments of the invention.

FIG. 9 illustrates a flowchart of a method in accordance with certain embodiments of the invention. The method illustrated in FIG. 9 includes, at 910, providing, by a network node, an indication to a user equipment. The indication indicates that the network node supports interworking between a first radio-access technology and a second radio-access technology. The method may also include, at 920, receiving a request to set up a service flow. The method may also include, at 930, setting up the service flow.

Figure 10:
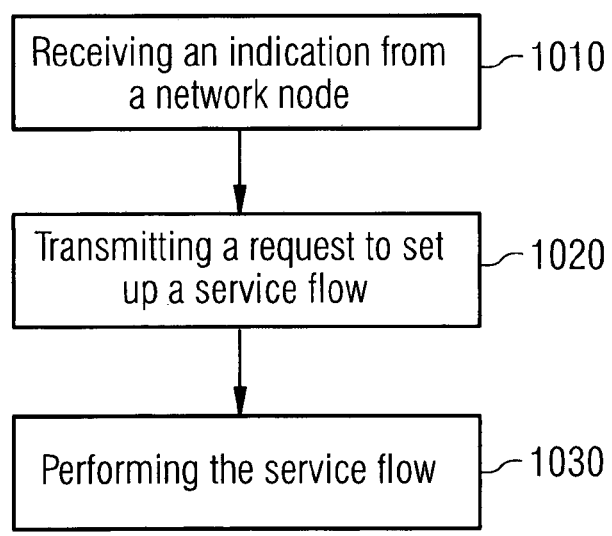
FIG. 10 illustrates a flowchart of a method in accordance with certain embodiments of the invention.

FIG. 10 illustrates a flowchart of a method in accordance with certain embodiments of the invention. The method illustrated in FIG. 10 includes, at 1010, receiving, by a user equipment, an indication from a network node. The indication indicates that the network node supports interworking between a first radio-access technology and a second radio-access technology. The method also includes, at 1020, transmitting a request to set up a service flow. The method may also include, at 1030, performing the service flow.

Figure 11:
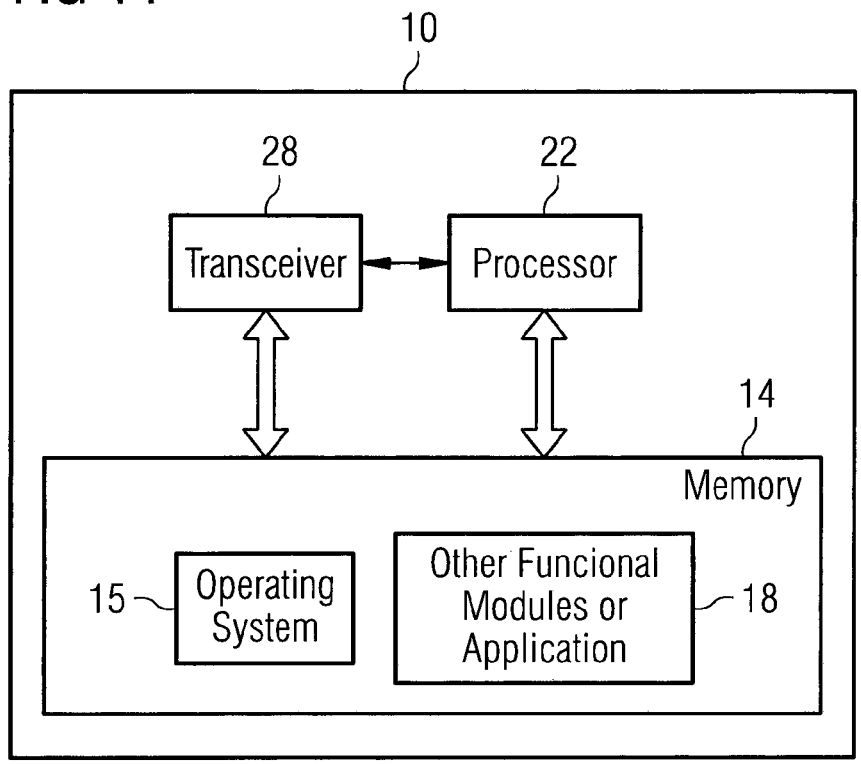
FIG. 11 illustrates an apparatus in accordance with certain embodiments of the invention.

FIG. 11 illustrates an apparatus in accordance with certain embodiments of the invention. In one embodiment, the apparatus can be a user equipment, a base station, and/or an eNB, for example. The apparatus can be a network node. Apparatus 11 can include a processor 22 for processing information and executing instructions or operations. Processor 22 can be any type of general or specific purpose processor. While a single processor 22 is shown in FIG. 11, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 12:
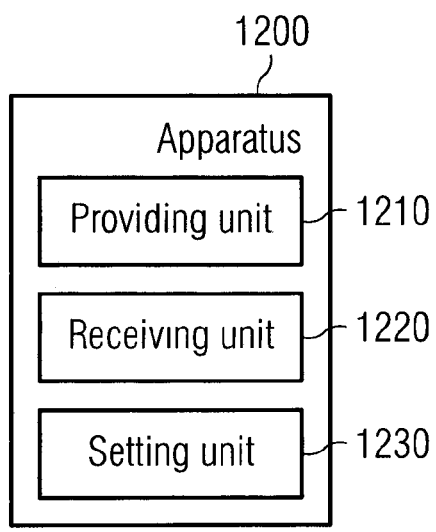
FIG. 12 illustrates an apparatus in accordance with certain embodiments of the invention.

FIG. 12 illustrates an apparatus in accordance with certain embodiments of the invention. Apparatus 1200 can be a network element/entity such as an evolved Node B, for example. Apparatus 1200 can include a providing unit 1210 that provides an indication to a user equipment. The indication indicates that the network node supports interworking between a first radio-access technology and a second radio-access technology. Apparatus 1200 may include a receiving unit 1220 that receives a request to set up a service flow. Apparatus 1200 may also include a setting unit 1230 that sets up the service flow.

Figure 13:
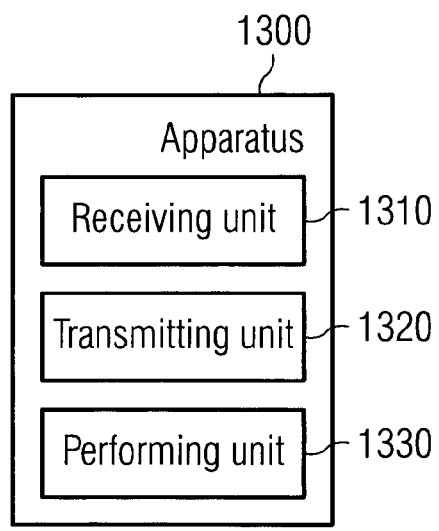
FIG. 13 illustrates an apparatus in accordance with certain embodiments of the invention.

FIG. 13 illustrates an apparatus in accordance with certain embodiments of the invention. Apparatus 1300 can be a network element/entity such as a user equipment, for example. Apparatus 1300 can include a receiving unit 1310 that receives an indication from a network node. The indication indicates that the network node supports interworking between a first radio-access technology and a second radio-access technology. Apparatus 1300 can also include a transmitting unit 1320 that transmits a request to set up a service flow. Apparatus 1300 may also include a performing unit 1330 that performs the service flow.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
providing, by a network node, an indication to a user equipment, wherein the indication indicates that the network node supports interworking between a first radio-access technology and a second radio-access technology,
wherein the network node is configured to use a technology stack,
wherein the technology stack comprises a 5G protocol stack on top of an LTE Medium Access Control layer and on top of a LTE physical layer,
wherein the 5G protocol stack includes 5G Non-Access Stratum protocol;
receiving a request to set up a service flow; and
setting up the service flow.

2. The method according to claim 1, wherein the network node comprises an evolved Node B.

3. The method according to claim 1, wherein the providing the indication comprises providing an indication that the network node is configured to support a technology stack, wherein the technology stack comprises a Non-Access Stratum protocol of the first radio-access technology over a radio-resource-control layer of the second radio-access technology.

4. The method according to claim 1, wherein the providing the indication comprises providing an indication that the network node is configured to use a technology stack, wherein the technology stack comprises a 5G Non-Access Stratum protocol over an LTE radio-resource-control layer.

5. An apparatus, comprising:
at least one processor; and
at least one memory including computer program code, the at least one memory and the computer program code configured, with the at least one processor, to cause the apparatus at least to provide an indication to a user equipment, wherein the indication indicates that the apparatus supports interworking between a first radio-access technology and a second radio-access technology,
- wherein the apparatus is configured to use a technology stack,
- wherein the technology stack comprises a 5G protocol stack on top of an LTE Medium Access Control layer and on top of a LTE physical layer,
- wherein the 5G protocol stack includes 5G Non-Access Stratum protocol;

receive a request to set up a service flow; and
set up the service flow.

6. The apparatus according to claim 5, wherein the apparatus comprises an evolved Node B.

7. The apparatus according to claim 5, wherein the providing the indication comprises providing an indication that the apparatus is configured to support a technology stack, wherein the technology stack comprises a Non-Access Stratum protocol of the first radio-access technology over a radio-resource-control layer of the second radio-access technology.

8. The apparatus according to claim 5, wherein the providing the indication comprises providing an indication that the network node is configured to use a technology stack, wherein the technology stack comprises a 5G Non-Access Stratum protocol over an LTE radio-resource-control layer.

9. A method, comprising:
receiving, by a user equipment, an indication from a network node, wherein the indication indicates that the network node supports interworking between a first radio-access technology and a second radio-access technology,
- wherein the user equipment is configured to use a technology stack,
- wherein the technology stack comprises a 5G protocol stack on top of an LTE Medium Access Control layer and on top of a LTE physical layer,
- wherein the 5G protocol stack includes 5G Non-Access Stratum protocol;

transmitting a request to set up a service flow; and
performing the service flow.

10. The method according to claim 9, wherein the receiving the indication comprises receiving an indication that the network node is configured to support a technology stack, wherein the technology stack comprises a Non-Access Stratum protocol of the first radio-access technology over a radio-resource-control layer of the second radio-access technology.

11. The method according to claim 9, wherein the receiving the indication comprises receiving an indication that the network node is configured to use a technology stack, wherein the technology stack comprises a 5G Non-Access Stratum protocol over an LTE radio-resource-control layer.

12. An apparatus, comprising:
at least one processor; and
at least one memory including computer program code,
the at least one memory and the computer program code configured, with the at least one processor, to cause the apparatus at least to receive an indication from a network node, wherein the indication indicates that the network node supports interworking between a first radio-access technology and a second radio-access technology,
- wherein the apparatus is configured to use a technology stack,
- wherein the technology stack comprises a 5G protocol stack on top of an LTE Medium Access Control layer and on top of a LTE physical layer,
- wherein the 5G protocol stack includes 5G Non-Access Stratum protocol;

transmit a request to set up a service flow; and
perform the service flow.

13. The apparatus according to claim 12, wherein the receiving the indication comprises receiving an indication that the network node is configured to support a technology stack, wherein the technology stack comprises a Non-Access Stratum protocol of the first radio-access technology over a radio-resource-control layer of the second radio-access technology.

14. The apparatus according to claim 12, wherein the receiving the indication comprises receiving an indication that the network node is configured to use a technology stack, wherein the technology stack comprises a 5G Non-Access Stratum protocol over an LTE radio-resource-control layer.

* * * * *